May 4, 1926.
D. S. DE LAVAUD
1,583,531
VARIABLE SPEED POWER TRANSMISSION
Filed Jan. 26, 1923   3 Sheets-Sheet 2
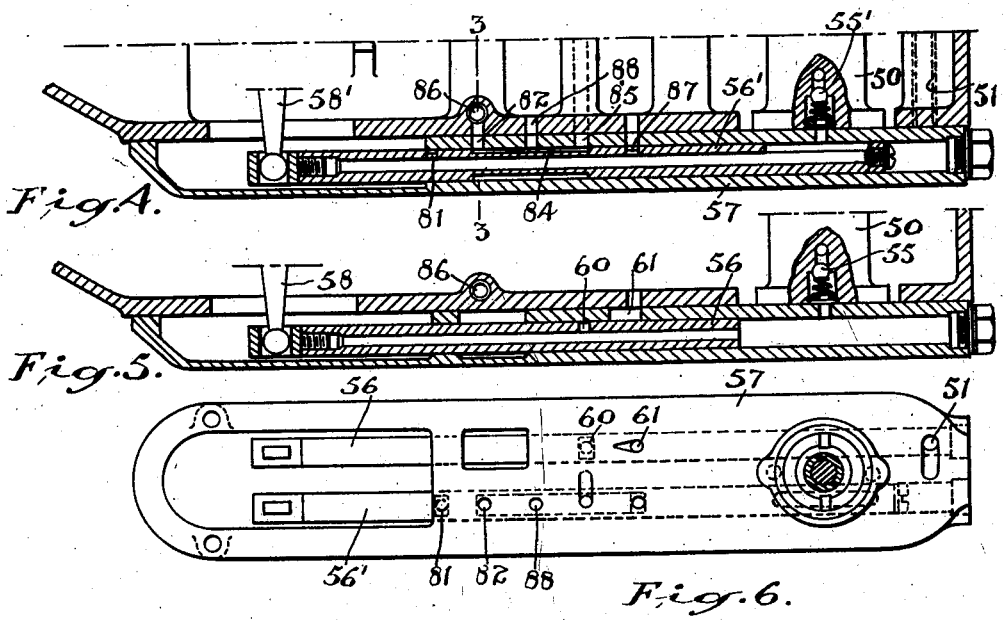
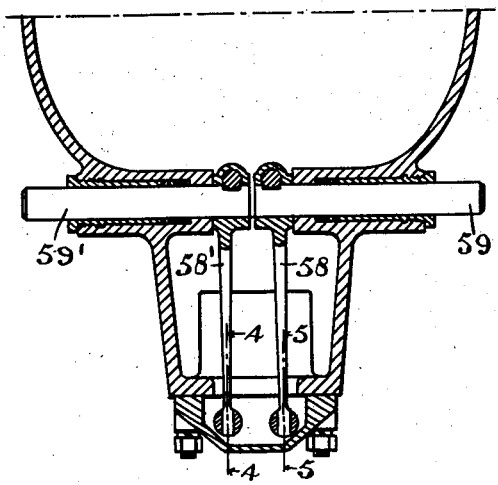
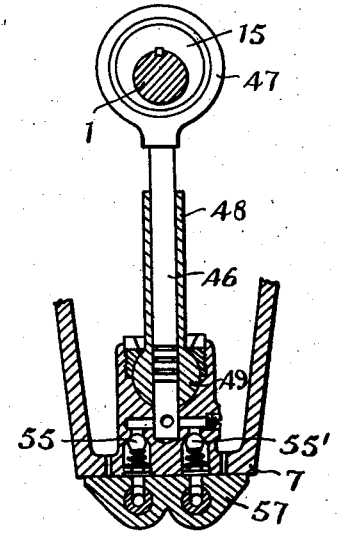
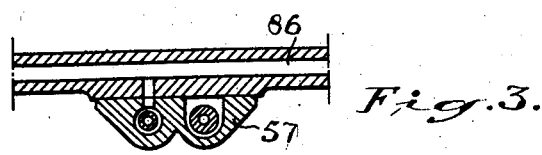
Inventor.
Dimitri Sensaud de Lavaud
by H. J. S. Dennison atty.

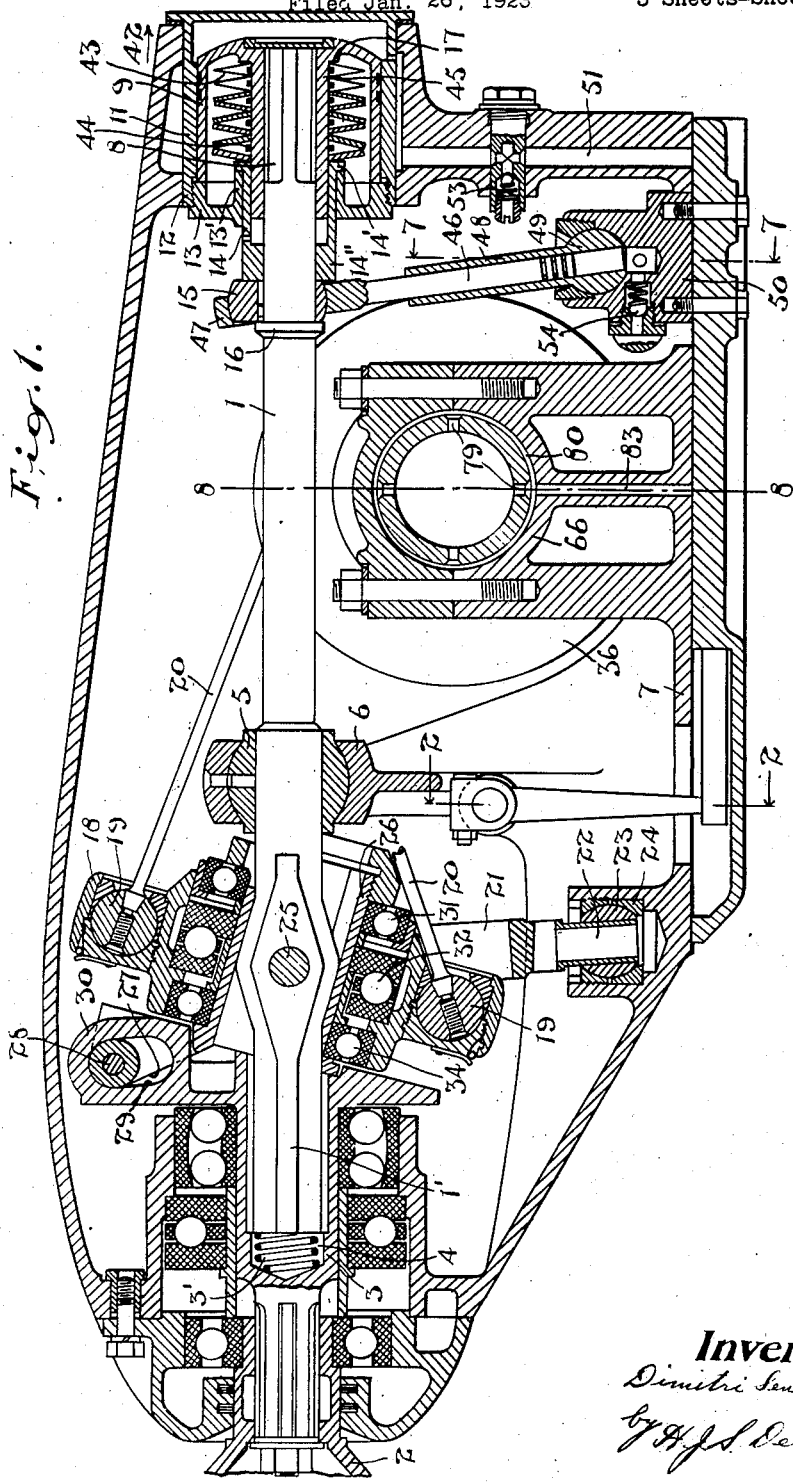

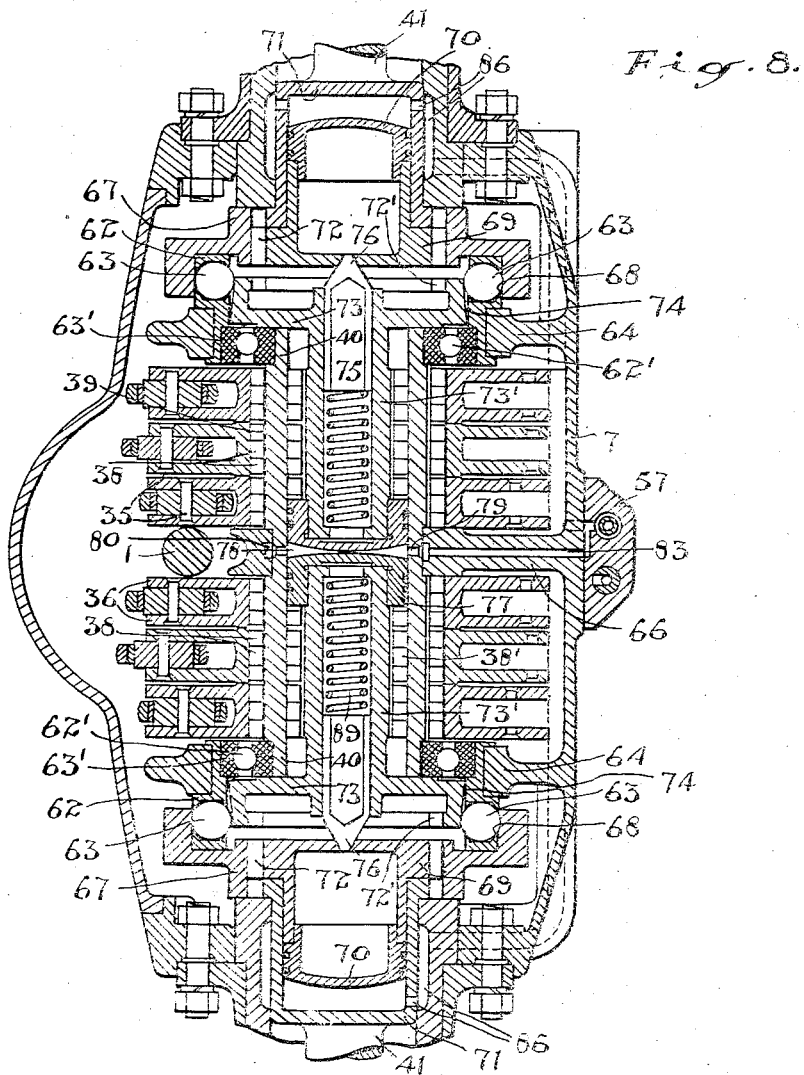

Patented May 4, 1926.

1,583,531

UNITED STATES PATENT OFFICE.

DIMITRI SENSAUD DE LAVAUD, OF PARIS, FRANCE.

VARIABLE-SPEED POWER TRANSMISSION.

Application filed January 26, 1923. Serial No. 615,055.

*To all whom it may concern:*

Be it known that I, DIMITRI SENSAUD DE LAVAUD, a citizen of the United States of Brazil, and resident of the city of Paris, in the Republic of France, have invented certain new and useful Improvements in a Variable-Speed Power Transmission, described in the following specification, and illustrated in the accompanying drawings, that form part of the same.

The principal objects of this invention are, to enable the controlling of the speed of a variable power transmission, such as described in my copending United States patent application, Serial Number 532,463, without at any period disengaging the transmission from the source of power.

The principal feature of the invention consists in utilizing hydraulic pressures to vary the longitudinal displacement of the driving shaft independent of the load to effect the relative position of the oscillating driving member and the driving shaft and to effect the operation of clutch mechanisms in the driven shaft structures to cause reversal movements from a constant driving source.

The accompanying drawings represent the application of this invention to the control of the divided axle of a motor car.

Figure 1 is a vertical longitudinal midsection through the driving mechanism.

Figure 2 is a transverse section through the line 2—2 of Figure 1.

Figure 3 is a longitudinal vertical section on the line 3—3 of Figure 4.

Figure 4 is a partial longitudinal vertical section through the line 4—4 of Figure 2.

Figure 5 is a partial transverse section on the line 5—5 of Figure 2.

Figure 6 is a plan view of the casing enclosing the hydraulic speed changing gear control members.

Figure 7 is a transverse section on the line 7—7 of Figure 1.

Figure 8 is a longitudinal vertical section on the line 8—8 of Figure 1 through the divided axle.

The central shaft 1 of the arrangement is connected to the motor shaft by the intermediary of a joint or conical coupling 2 arranged at the extremity of a driving sleeve 3, the bore 4 of which engages the fluted portion 1' of the central shaft 1. The sleeve 3 and the shaft 1 rotate together and the shaft 1 is longitudinally movable with respect to the sleeve 3. A return spring 3' is interposed between the extremity 1' of the shaft 1 and the bottom of the bore 4 of the sleeve 3.

The shaft 1 is supported in its centre by the spherical bearing 5 mounted in the standard 6 rigid with the casing 7 which encloses the apparatus, and the extremity 8 of said shaft extends into the hollow central body of a piston 9 with which it rotates, the end 8 of the shaft 1 being splined into said piston. The cylinder 11 in which the piston 9 is centered is closed by a cap 13 threaded into the portion 12.

The central hub 13' of the cap 13 forms a sliding support for a sleeve 14, the flange 14' of which shoulders on the central hub 13' of the cover and bears at its inner extremity 14'' on the side face of an eccentric disc 15 which is keyed on the shaft 1 and is held in alignment with the longitudinal axis of this latter by the collar 16. An arrangement of flexible members operates between the flanges 14' and 17 so as to return the piston 9 to its outer position, that is to say, towards the exterior end of the cylinder 11.

The oscillatable disc 18 supported on the shaft 1 is provided with spherical sockets equally spaced on an even circumference and receiving the spherical ends 19 which constitute the extremity of the traction rods 20. The number of these rods is in practice equal to six and their respective lengths as well as the radii of their cranks are properly determined so that for a given amplitude of the oscillations of the motor disc, the angular velocities that they impress on the turning parts, from which is derived the rotation of the driven shafts, may be practically equal.

The motor disc 18 is retained in a positive position by the ends of two lateral pivots arranged in alignment with the pivot 25 and carried at the ends of a forked support 21 provided at its lower end with a turned journal 22 able to oscillate relative to one of the diameters of a spherical sleeve 23 held between the two bushes of a bearing 24 rigid with the casing 7 which encloses the apparatus. The periodic oscillation of the motor disc 18 is obtained through the rotation of the motor shaft, the disc being mounted on the ball bearings 31—32 and 34 carried on the sleeve 26.

This sleeve 26 carries an arm 27 which engages by an axis with sliding connection 28 in a slot 29 of a projection 30 rigid with the driving sleeve 3. The sleeve 3 determines, as indicated before, the drive of the sleeve 26 and of the central shaft from the fact of its connection with the motor shaft and the disc oscillates on the axis 25.

The amplitude of this oscillating movement depends on the initial inclination of the disc with respect to the shaft 1, which inclination is determined by the distance measured horizontally between the diametral axis 25 and the articulation 28—29 fixed in longitudinal transmission, the oscillations of the motor disc ceasing when it becomes perpendicular to the shaft 1.

The connecting rods 20 which transform the oscillations of the disc into continuous movement of the receiving shafts are articulated in one of the suitable points 35 (see Fig. 8) by independent annuli 36 whose smooth internal face engages the rollers 38 in contact with a circumferential arrangement of inclined planes formed on the external surface 39 of a sleeve 40 in the rear axle structure so as to constitute a system of free wheels conforming to the description contained in my co-pending U. S. application 532,463. This mechanism drives the sleeve 40 only in one direction of the angular displacement of the annuli 36. This direction corresponds to a tractive effort exercised by each of the connecting rods upon its annulus. The active forces of the connecting rods 20 are combined so that the sleeve 40 turns with a continuous movement.

It is to be noted that this system, applied to the control of the driving wheels of a vehicle allows a differential action to be realized in an extremely simple way. The movement of the sleeve 40 is transmitted to the independent shafts 41, which are each connected with a drive wheel, by the intermediary of a free wheel system similar to that which connects the annuli to the sleeve. The external surface of the shafts or of a part which turns with them is provided with a circumferential arrangement of inclined planes which co-operate with the engaging rollers 38'.

The speed variations of the continuous movement of rotation of the sleeve 40 are automatically a function of the resisting couple which is transmitted through an elastic system interposed between the collars 14' and 17 (Fig. 1) and assisted by the spring 3'. This system is formed by a series of Belleville spring discs whose mechanical units grow less from one to the next in the direction of compression of the system, that is to say, in the direction of the arrow 42. The piston 9 being supposed fixed, the result of the resistance exercised by the connecting rods 20 on the motor disc 18 is transmitted through the elastic system and in consequence the shaft 1 is moved in the direction indicated by the arrow 42.

This transmission effort which depends directly on the resisting couple applied on the sleeve 40 is at each moment put in equilibrium by the elastic reaction of the system of spring discs. The discs 43 of the weakest mechanical units are first flattened and the effort of compression increasing, the flattening of the adjacent spring discs is brought about gradually. The flattening of each pair of spring discs is limited by separators 44 encircling the bored trunk 45 of the piston 9. An elastic reaction is thus effected which is always sensibly proportional to the value of the resisting couple. To this value corresponds a given inclination of the motor disc and consequently a corresponding velocity of rotation of the sleeve 40. This velocity is as much lower for the same angular velocity of the motor shaft as the resisting couple is higher.

In order to stop the rotation of the driven shafts 41 without interrupting the rotation of the motor shaft it is required, as above indicated, to displace the shaft 1 longitudinally so that the motor disc 18 is perpendicular to it. This effect is brought about by suppressing the hydraulic pressure, which is exercised behind the piston 9 to keep it fixed, and aided by the recoil of the spring 3', that is to say, without the help of a direct mechanical operating element being interposed between the operating lever (foot pedal for example) and the controlling shaft.

Hydraulic pressure which can be controlled at will and which is introduced behind the piston 9 is produced by a compression pump which pumps the oil from the casing 7, whose lower part forms a reservoir, and forces it behind the piston 9 so as to displace this latter in the direction of compression of the flexible spring discs 43. This compression pump comprises a piston 46 in trunk form whose upper extremity 47 encircles the eccentric disc 15 fitted on the motor shaft 1, and a cylinder 48 whose lower end is in the form of a spherical head 49 supported in a bearing 50 secured within the casing 7 and constituting at the same time the distribution box of the pump. The oil is forced behind the piston 9 through the conduit 51 formed in the casing and in which is interposed a discharge valve controlled by a regulating spring 53 so as to open from a determined pressure.

The tension of this spring 53 may be regulated from the outside by any suitable arrangement so as to modify in a certain measure and according to need the characteristics of the apparatus. The control of this valve regulates the value of compression of the system of flexible spring discs 43 under the pressure of the piston 9. The suction valve of the pump is indicated at 54 and the two recharging valves at 55 and 55'.

Two cylindrical slide valves 56 and 56' are arranged in a distribution casing 57 secured under the frame 7 of the apparatus and can be operated independently by means of the levers 58 and 58' (Fig. 2) controlled from the outside by foot pedals fitted on the shafts 59 and 59'.

To control the movement of the driven shaft and cause it to slow down or cease, the slide valve 56 (Fig. 5) is moved into a position to bring the orifices 60 and 61 to coincide, thus opening to the interior of the casing 7 so that oil taken into the pump through the valve 54 is returned to the casing 7. When it is desired to operate the driven shaft the slide valve 56 is moved into the position shown in Figure 5.

The pump 46 is utilized to effect the hydraulic control of change of direction, that is to cause rotation of the driven shaft either forward or back.

In the mechanism for effecting change of direction, as illustrated in Figure 8, the annular members 62 are formed with sockets in which the balls 63 can turn on themselves. The members 62 are fixed in the supports 64 solid with the frame and each constitutes at the same time the cradle 63' of the ball bearing 62' supporting the sleeve 40 at its extremities. This sleeve 40 is supported central of its length in the smooth bearing 66. Each driven shaft section 41 is cast integral with a disc 67 whose lateral inward face 68 is in permanent contact with the balls 63. Within the central part of this disc 67 is arranged a clutch disc 69 solid with a piston 70 which is slidably arranged in a cylinder 71 drilled in the hub of the disc 67. The teeth 72 of this clutch disc are adapted to engage with the corresponding teeth 72' of a disc 73 whose hub 73' constitutes the differential nave of the free wheel already described.

The periphery of this disc 73 is in the form of a conical surface 74 and when the discs 73 are moved longitudinally they engage with the balls 63 which operate as reversing wheels and effect the backward running of the discs 67 and consequently of the driving shafts 41. A central cone point 75 is slidably arranged in the central part of each disc 73 and its conical extremity 76 is adapted to engage in the conical cavity in the centre of the clutch disc 69.

Each of the differential naves 73' has secured to its inner end a piston 77 having a convexed inner end. These convexed faces engage and form an annular cavity 78 in permanent connection with the annular chamber 80 through the orifices 79. (See Figs. 1 and 8.)

In forward running the sliding valve 56' (Fig. 4) is placed so that the orifices 81 and 82 are opposite. In this position the channel 83 which ends in the annular chamber 80 is open to the casing 7 through the chamber 84 and the orifice 85. The pump then forces oil through the valve 55' and across the conduit 86 behind the pistons 70 which forces the clutch discs 69 into mesh with the discs 73. To reverse the movement the sliding valve 56' is moved so that the orifices 85 and 87 coincide when the cylinder 71 is open through the chamber 84 and the orifice 88. The springs 89 acting against the points 75 force the clutch discs clear of the discs 73 and the pump forces the oil into the channel between the two pistons 77, thereby causing the discs 73 to engage the balls 63 to effect the backward running.

From the foregoing description it will be seen that the driving shaft is continually operated and by manipulation of the levers 58 and 58' through suitable foot pedals the hydraulic pressure may be controlled to regulate the reactive pressure of the elastic unit governing the longitudinal movement of the shaft 1 so that without changing the speed of the shaft 1, the speed of the driven shaft may be varied by shifting the angularity of the oscillating driving member by means other than the torque of the driven shaft. The direction of movement of the driven shaft is also very readily controlled through manipulation of the said levers to cause the vehicle to move forward or backward.

What I claim as my invention is:—

1. In a variable speed power transmission, the combination with an oscillating member operatively connected with the driven shaft, a longitudinally movable driving shaft and elastic means opposing the longitudinal movement of said shaft, of hydraulic means for opposing the longitudinal movement of the shaft.

2. In a variable speed power transmission, the combination with an oscillating member operatively connected with the driven shaft, a longitudinally movable driving shaft and elastic means opposing the longitudinal movement of said shaft, of a controllable hydraulic means for opposing the longitudinal movement of the driving shaft.

3. In a variable speed power transmission, the combination with an oscillating member operatively connected with the driven shaft, a longitudinally movable driving shaft and elastic means opposing the longitudinal movement of said shaft, of a piston mounted on the driving shaft, a cylinder enclosing said piston, and means for maintaining controlled hydraulic pressures within the cylinder against said piston to regulate the longitudinal movement of the driving shaft.

4. In a variable speed power transmission, the combination with an oscillating member operatively connected with the driven shaft, a longitudinally movable driving shaft and elastic means opposing the longitudinal movement of said shaft, of a piston slidably arranged upon the movable longitudinal driving shaft, a sleeve secured to the shaft in slidable relation with the piston, a plurality of spring members arranged between said sleeve and said piston, a cylinder enclosing the piston, and means for regulating the hydraulic pressure within said cylinder to oppose the movement of the piston through the elastic medium of the springs.

5. In a variable speed power transmission, the combination with an oscillating member operatively connected with the driven shaft, a longitudinally movable driving shaft and elastic means opposing the longitudinal movement of the shaft, of a piston carried on the longitudinally movable shaft, a cylinder containing said piston, an elastic connection between the piston and shaft, a hydraulic pump operated by said shaft and connected with said cylinder, and valves for controlling the pressure flow from the pump to said cylinder.

6. In a variable speed power transmission, the combination with an oscillating member operatively connected with the driven shaft, a longitudinally movable driving shaft and elastic means opposing the longitudinal movement of the shaft, a hydraulic pump cylinder arranged on a swivel support, a piston operating in said cylinder, a swivel eccentric arranged on said drive shaft and operating said piston and valves controlling the flow of pressure fluid to said cylinder.

DIMITRI SENSAUD DE LAVAUD.